(12) United States Patent
Watts

(10) Patent No.: US 10,724,555 B2
(45) Date of Patent: Jul. 28, 2020

(54) GENERATING TWO PNEUMATIC SIGNALS TO OPERATE AN ACTUATOR ON A VALVE ASSEMBLY

(71) Applicant: Dresser, LLC, Addison, TX (US)

(72) Inventor: Harold George Watts, East Falmouth, MA (US)

(73) Assignee: Dresser, LLC, Houston, TX (US)

( * ) Notice: Subject to any disclaimer, the term of this patent is extended or adjusted under 35 U.S.C. 154(b) by 81 days.

(21) Appl. No.: 15/662,336

(22) Filed: Jul. 28, 2017

(65) Prior Publication Data
US 2019/0032683 A1   Jan. 31, 2019

(51) Int. Cl.
  *F15B 13/043*   (2006.01)
  *F16K 31/12*   (2006.01)
  *F15B 11/02*   (2006.01)

(52) U.S. Cl.
  CPC .......... *F15B 13/0433* (2013.01); *F15B 11/02* (2013.01); *F16K 31/12* (2013.01); *F15B 2211/212* (2013.01); *F15B 2211/8752* (2013.01); *F15B 2211/8755* (2013.01); *F15B 2211/8855* (2013.01); *Y10T 137/2278* (2015.04)

(58) Field of Classification Search
  CPC ................ Y10T 137/2278; F15B 11/02; F15B 13/0433; F16K 31/12
  USPC ....... 251/26, 28, 30.01; 91/462–466
  See application file for complete search history.

(56) References Cited

U.S. PATENT DOCUMENTS

| | | | |
|---|---|---|---|
| 3,107,693 A * | 10/1963 | Puster | F16K 31/1266 137/625.66 |
| 3,994,311 A | 11/1976 | Walle | |
| 4,680,441 A * | 7/1987 | McKendrick | G05D 16/2093 219/89 |
| 4,705,067 A * | 11/1987 | Coffee | G05D 16/2013 137/487.5 |
| RE32,588 E * | 2/1988 | Bowen | F15B 1/02 251/28 |
| 6,802,242 B1 * | 10/2004 | Steinke | F15B 1/024 91/454 |
| 6,848,641 B2 * | 2/2005 | Lohmann | B65H 49/16 242/129 |
| 6,957,127 B1 | 10/2005 | Smart | |
| 7,458,310 B2 | 12/2008 | Junk | |

(Continued)

FOREIGN PATENT DOCUMENTS

EP    0240541    4/1992

OTHER PUBLICATIONS

Extended European Search Report and Opinion issued in connection with corresponding EP Application No. 18185002.5 dated Jan. 11, 2019.

*Primary Examiner* — Kevin F Murphy
(74) *Attorney, Agent, or Firm* — Paul Frank + Collins P.C.

(57) ABSTRACT

A controller configured to improve response time on a valve assembly. The controller may have flow modifying structure that couples with a pair of pneumatic outputs, both pneumatically coupled with an actuator on the valve assembly. The flow modifying structure can be configured to convert incoming instrument air into a pair of independent, pneumatic output signals, at least one of which flows directly to the actuator. In one implementation, a volume booster may be used to increase pressure of the other pneumatic output signal upstream of the actuator.

18 Claims, 5 Drawing Sheets

(56) References Cited

U.S. PATENT DOCUMENTS

| | | | |
|---|---|---|---|
| 8,375,842 B2* | 2/2013 | Kolbenschlag | F15B 11/08 |
| | | | 91/361 |
| 8,807,168 B2* | 8/2014 | Lovell | F15B 13/0405 |
| | | | 137/625.66 |
| 9,010,376 B2 | 4/2015 | Watts | |
| 9,222,490 B2* | 12/2015 | Fishwick | F15B 13/0405 |
| 9,360,026 B2* | 6/2016 | Okuda | F15B 5/006 |
| 2010/0132542 A1 | 6/2010 | Kolbenschlag et al. | |
| 2011/0284083 A1* | 11/2011 | Tondolo | F15B 20/002 |
| | | | 137/1 |
| 2012/0248363 A1 | 10/2012 | Inagaki | |
| 2014/0117263 A1 | 5/2014 | Valentin-Rumpel | |
| 2017/0175909 A1 | 6/2017 | Kinser et al. | |

* cited by examiner

GENERATING TWO PNEUMATIC SIGNALS TO OPERATE AN ACTUATOR ON A VALVE ASSEMBLY

BACKGROUND

Flow controls are important in many industries. Whether found on process lines, gas distribution networks, or any system that carries flowing material, flow devices like valve assemblies are vital to regulate material flow within set parameters. Or, in case of problems, the valve assembly can shut-off flow altogether.

Valve assemblies may leverage mechanical mechanisms to regulate this flow. For valve assemblies, these mechanisms may include an actuator, likely pneumatic, that couples with a closure member via a stem. The closure member may embody a plug, a ball, a butterfly valve, and/or like implement that can contact a seat to prevent flow. A sensing mechanism may be useful to monitor the position of the closure member relative to a seat. This sensing mechanism can have a position sensor and a mechanical linkage that couples the position sensor with the stem or other structure that moves in concert with the closure member. In some examples, the actuator includes a pneumatic actuator that converts energy (e.g., compressed air) into mechanical motion to cause the closure member to move between an opened position, a partially opened position, and a closed position.

Valve assemblies may also include computing components that automate operation of the device. These computing components may integrate as part of a controller or "valve positioner." During operation, the controller receives and processes a control signal from a process control system (also "distributed control system" or "DCS system"). The control signal may define operating parameters for the valve assembly. These operating parameters may set an appropriate flow of material through the valve assembly and into the process line. The controller can translate the operating parameters, often in combination with the output from the position sensor, to regulate instrument gas into the actuator. The instrument gas may pressurize (or de-pressurize) the actuator in a way that moves the valve stem and, in turn, locates the closure member in position relative to the seat to coincide with the operating parameters.

SUMMARY

The subject matter disclosed herein relates to improvements that enhance performance of valve assemblies. Of particular interest are embodiments of a controller that can outfit valve assemblies so that the actuator operates to open and close a valve more quickly or at better response times. Notable is that the embodiments can use a single pneumatic signal to convert instrument air into a pair of pneumatic output signals, at least one of which flows directly to the actuator that pressurize the actuator. The other may flow to a volume booster found upstream of the actuator. This proposed "dual-port" design can provide independent pressure control to provide different pneumatic signals with different parameters (e.g., flow, pressure, etc.) to operate the actuator on the valve assembly.

DRAWINGS

Reference is now made briefly to the accompanying drawings, in which.

Figure 1:
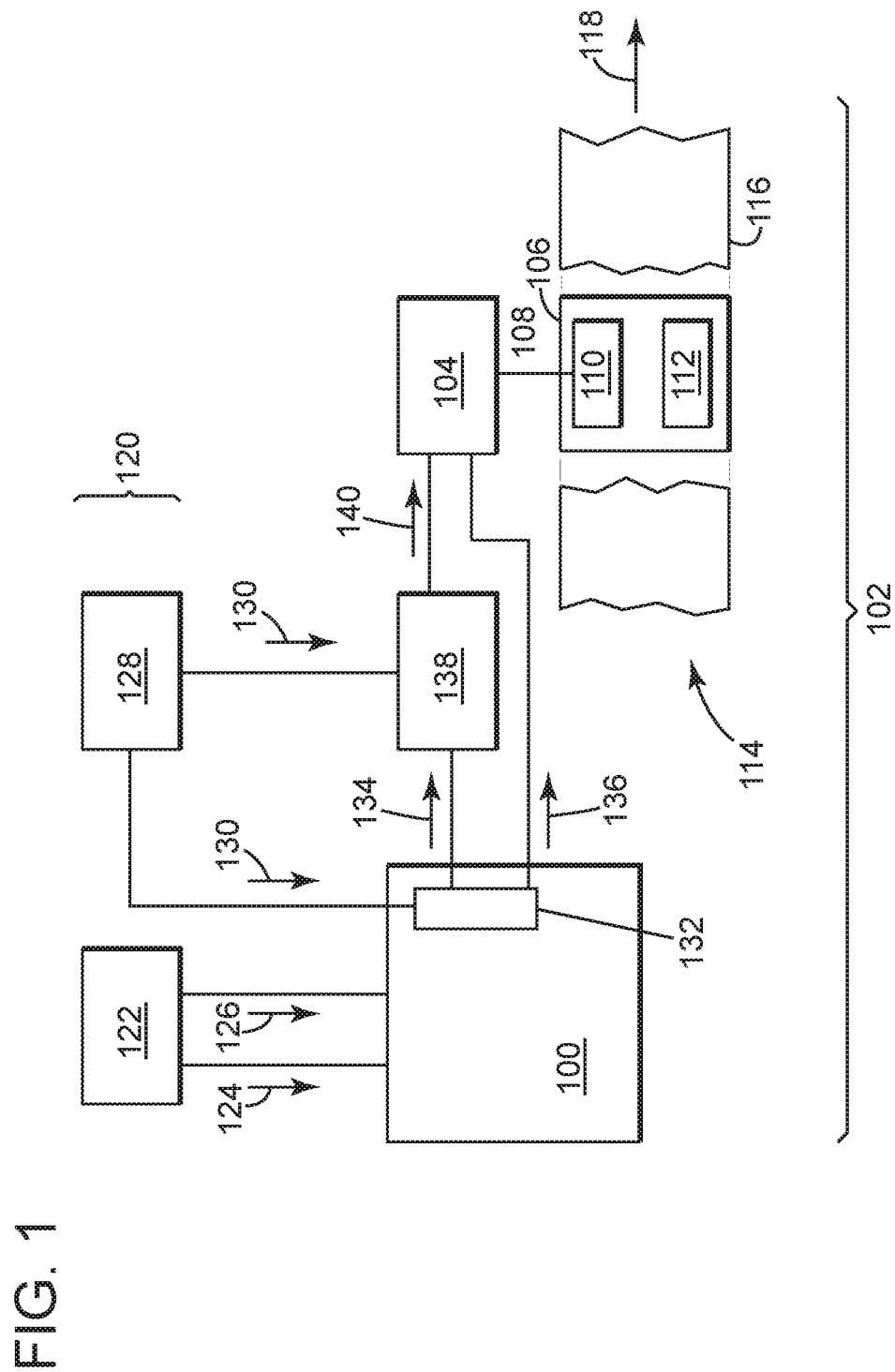
FIG. 1 depicts a schematic, block diagram of an exemplary embodiment of a controller for use to operate a flow device like a valve assembly.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages

DETAILED DESCRIPTION

The discussion below describes embodiments of a controller for use with flow devices and fluid controls. The controller is shown to operate with a valve assembly, but the concepts may percolate to other fluid regulating devices (e.g., pressure regulators), particularly those that utilize fluid for actuation. The embodiments may be configured to work in conjunction with a volume booster or like pressure-enhancing device. As noted more below, these configurations may eliminate the need to manually tune the volume booster. The "dual-port" design may also correct anomalies that the volume booster may introduce, including some delay and performance uncertainty, which can prevent use or even failure of auto-tuning features that the controller may implement via calibration software.

FIG. 1 schematically depicts an exemplary embodiment of a controller 100 to implement these improvements. The controller 100 is shown as part of a flow device, generally identified with the numeral 102 and discussed here as a "valve assembly." In this regard, the valve assembly 102 may include an actuator 104 that couples with a valve 106 via an actuating element 108 (or, for valve assemblies, "valve stem 108"). The valve 106 may include a closure member 110 that can move relative to a seat 112. The valve assembly 102 may integrate into a process line 114 that includes a conduit 116 for transfer of material 118. A process control system 120 may couple with the flow devices on the process line 114, including the valve assembly 102. The process control system 120 may be configured with a main control loop 122 that provides one or more signals (e.g., a control signal 124 and a power signal 126). This configuration may also include a fluid supply 128 that provides a fluid input 130, typically instrument air. As also shown, the controller 100 may include a pneumatic output device 132 that may be configured to modulate instrument gas 130 into a pair of pneumatic signals (e.g., a first pneumatic signal 134 and a second pneumatic signal 136). The pneumatic output device 132 may couple with a supplemental pneumatic control 138, possibly in position upstream of the actuator 104. The supplemental pneumatic control 138 may modulate instrument gas 130 to generate a third pneumatic signal 140 (or "boosted signal 140").

Broadly, use of the pneumatic output device 132 outfits the controller 100 to improve performance of the valve assembly 102. Devices that leverage the "dual-port" design of the pneumatic output device 126 can effectively provide one of the signals 134, 136 to operate the supplemental pneumatic control 138 and provide, independently, one of the signals 134, 136 to the actuator 104. This configuration affords independent pressure control of the actuator 104. This feature may avoid disruptions in control and response times that may result from operational "deadbands" that correlate with build up of pressure differentials necessary for the control 138 to generate the boosted signal 140. The design can also reduce reliance on manual adjustments that require experience and time to tune out these deadbands. In addition, the design may mask delay and other operational uncertainties due to the supplemental pneumatic control 138 to allow proper use of calibration software to auto tune operation of the valve assembly 102 to tolerate variations in process characteristics on the process line 114.

Figure 2:
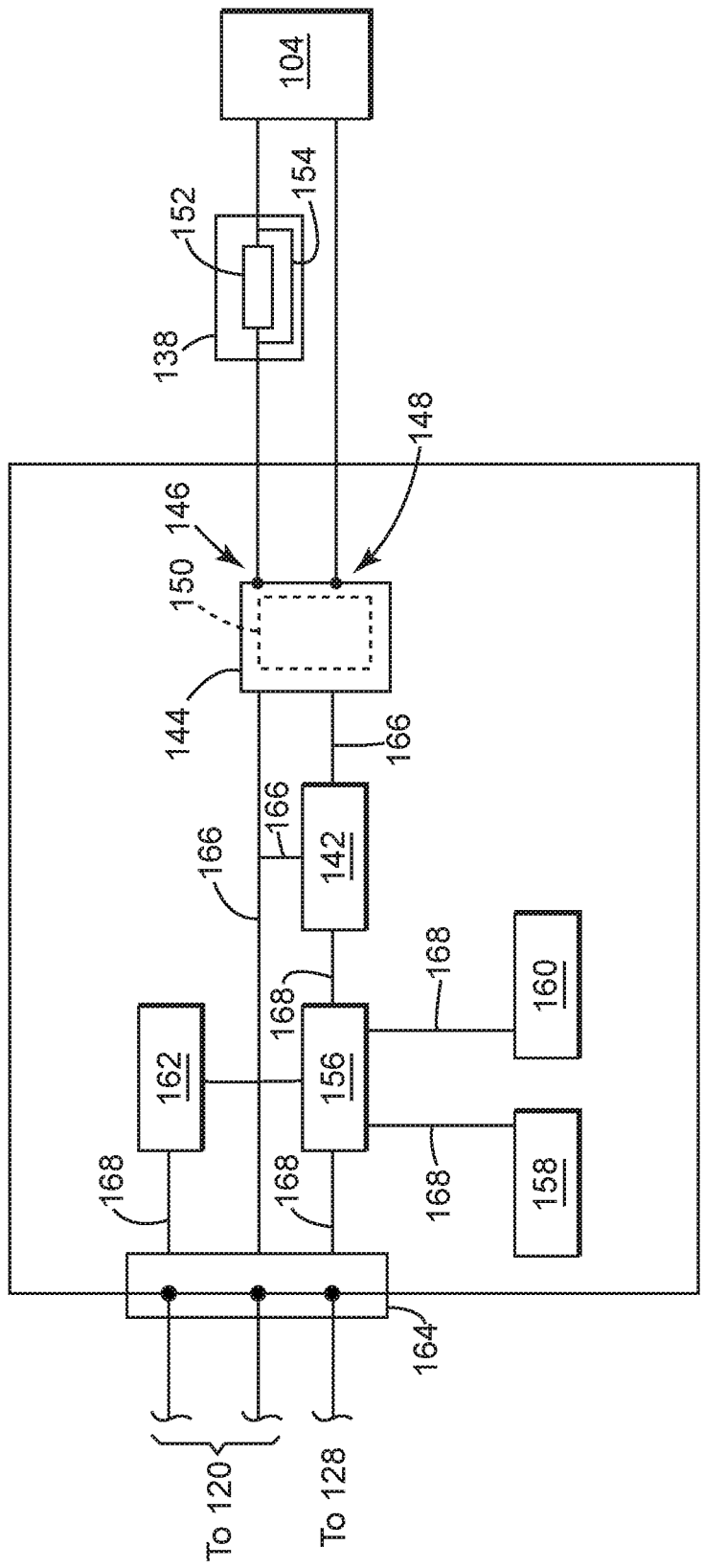
FIG. 2 depicts a schematic, block diagram of an example of structure for the controller of FIG. 1.

FIG. 2 depicts a schematic diagram of exemplary structure for the controller 100 to implement the dual-port design. The pneumatic output device 132 may include a signal converter 142 that couples with an amplifier 144. In one implementation, the amplifier 144 may comprise a pair of output ports (e.g., a first output port 146 and a second output port 148). The ports 146, 148 may correspond with flow modifying structure 150 internal to the amplifier 144 that can generate the signals 134, 136. The supplemental pneumatic control 138 may be configured to include a volume booster 152 and a bypass 154. The volume booster 152 may be analogous to a constant-pressure flow amplifier, which increases the flow of air to the actuator 104 while maintaining the line control pressure. The bypass 154 is useful to operate as gain adjustment for stability. As also shown, the controller 100 may include a central or main board 156 that couples with the signal converter 146. The main board 156 may also couple with certain peripheral controls (e.g., a pushbutton input device 158 and a display 160), as desired. A power supply 162 may provide electrical signals (e.g., current, voltage, etc.) to energize the main board 156 or the other parts of the controller 100. The controller 100 may also benefit from a signal interface 164 that may couple the controller 100 with the main control loop 122 and the instrument air supply 128. Internally, pneumatic bus 166 and electrical bus 168 may be useful to conduct pneumatic and electrical signals among the components of the controller 100. The pneumatic bus 166 may include conduit or tubing, although integrated manifolds may be used as well. Examples of the electrical bus 168 may utilize standard or proprietary communication busses including SPI, I²C, UNI/O, I-Wire, or one or more like serial computer busses known at the time of the present writing or developed hereinafter.

Figure 3:
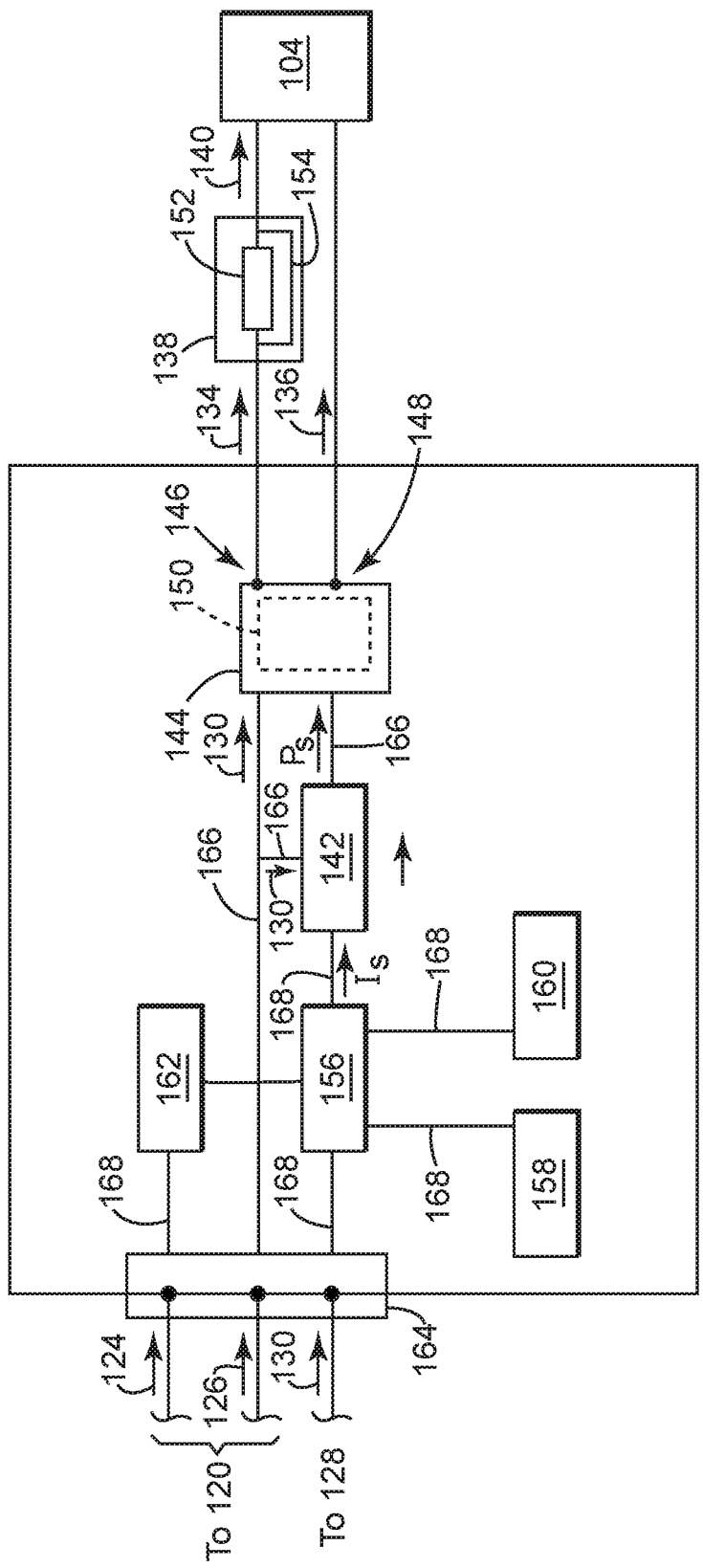
FIG. 3 depicts a schematic, block diagram of the controller of FIG. 2 as part of a system for controlling a valve assembly.

FIG. 3 depicts a signal pattern for both electrical and pneumatic signals that coincides with operation of the controller 100 of FIG. 2. Moving from left to right, the electrical bus 168 can direct the signals 124, 126 to the main board 156 and the power supply 162, respectively. The main control loop 122 may be configured for use in industrial automation environments. These configurations may employ protocols, like 4-20 milliamp, Foundation Fieldbus, or Profibus for example, which are useful to provide control (via the control signal 124) and power (via the power signal 126) and to the valve assembly 102. Power available from the main control loop power 122 may be approximately 40 milliwatts. In one implementation, the power supply 162 can generate proper DC voltage rail(s) for all the electrical components of the controller 100.

The main board 156 may be configured to manage functions and operative features on the controller 100. These configurations may include computing circuitry with topology that may include one or more processors and memory, often residing on a substrate (e.g., a printed circuit board). The computing circuitry may comprise a microcontroller that is fully integrated with processing and memory necessary to perform operations. Executable instructions may reside on the memory in the form of computer programs (e.g., firmware, software, etc.) that configure the processors to perform certain functions. In use, the main board 156 can process the control signal 124 to generate an input signal $I_s$, typically electrical current, that corresponds with an appropriate position for the closure member 110. The signal converter 142, such as a current-to-pneumatic (I/P) converter, can convert the input signal Is into a proportional pneumatic pressure output $P_s$ (also, "signal pressure $P_s$," or "pilot pressure $P_s$."). It is common, however, that signal pressure $P_s$ exhibits flow parameters (e.g., flow, pressure, etc.) that are inadequate to properly energize the actuator 104

The flow modifying structure 150 of the amplifier 142 may be configured to remedy this deficiency. These configurations may integrate components (e.g., diaphragms, valves, etc.) into a single or unitary package with, for example, an input for the instrument air 130, an input for the signal pressure $P_s$, and the dual ports 146, 148. Collectively, the components may embody pneumatic relays and like devices that, when combined together, can generate, independently, the separate pneumatic signals 134, 136 to exhibit different parameters (e.g., different flow, different pressure, etc.). In one implementation, the pneumatic relays may leverage one or more diaphragms that move in response to the signal pressure $P_s$. This diaphragm may operate an internal valve (or valves) to modulate the instrument air 130 to generate pneumatic signals 134, 136 that exit ports 146, 148. The pneumatic signals 134, 136 may have parameters that are proportional to the signal pressure $P_s$ at balanced conditions. Sizing of internal components and flow coefficients ($C_V$) for the flow modifying structure 150 may influence parameters for the pneumatic signals 134, 136. For example, the flow modifying structure 150 may convert the relatively small signal pressure $P_s$ so that pressure and flow of the first pneumatic signal 134 are greater than the pressure and flow of the second pneumatic signal 136. In this manner, the first port 146 could provide larger capacity flow (e.g., the first pneumatic signal 134) to meet requirements for faster response of the closure member 110. The second port 148 could provide low capacity flow (e.g., the second pneumatic signal 136) for fine control of the actuator 102 when, for example, small movements or relatively slow response of the closure member 110 are necessary.

The volume booster 152 may be configured to meet performance demands on the valve assembly 102. Preferably, the boosted signal 140 is at pressure and flow that are greater than the pressure and flow of the first pneumatic signal 134 (and, also, greater than the pressure and flow of the second pneumatic signal 136). This feature is useful to address operation of the valve assembly 102 that may require higher pressure flow or faster response of the closure member 110 (such as an emergency shutoff) that might outstrip capabilities of the amplifier 144 and the flow modifying structure 150 alone. In one implementation, the flow modifying structure 150 may include a small, closed volume to very quickly develop pressure of the first pneumatic signal 134. Concordantly, the volume booster 152 can rapidly pressurize and supply a large volume of air (e.g., the boosted signal 140) to the actuator 104 as necessary. The flow modifying structure 150 may, in turn, develop pressure of the second pneumatic signal 136 more slowly, for example, in concert with movement of the actuator 104.

The bypass 154 may be configured to operate as gain adjustment for stability in connection with use of the volume booster 152. These configurations may comprise a flow path (e.g., pipe, conduit, tube, etc.) with an inlet and an outlet found upstream and downstream of the volume booster 152, respectively. The bypass 154 may include an adjustment (e.g., a screw, a valve, etc.) to vary small volumes of air to travel from the inlet to the outlet without activating the volume boost function of the volume booster 152. This feature can regulate sensitivity of the volume booster 152 to prevent valve position overshoot that may result due to excess capacity. As noted herein, the flow modifying structure 150 may reduce reliance on the bypass 154 to avoid "deadband" issues that may prevail (at start-up or initialization) until flow is sufficient to operate the volume booster 152. Some implementations may configure the flow modifying structure 150 in a way to forgo the need for the bypass 154 altogether and, thus, eliminate these deadband issues. For example, it may be useful to configure the first pneumatic signal 134 so that the volume booster 152 meets demands for very large volumes and use the second pneumatic signal 136 for fine control. By eliminating the deadband in this way, the volume booster 152 may provide the quickest response possible.

Figure 4:
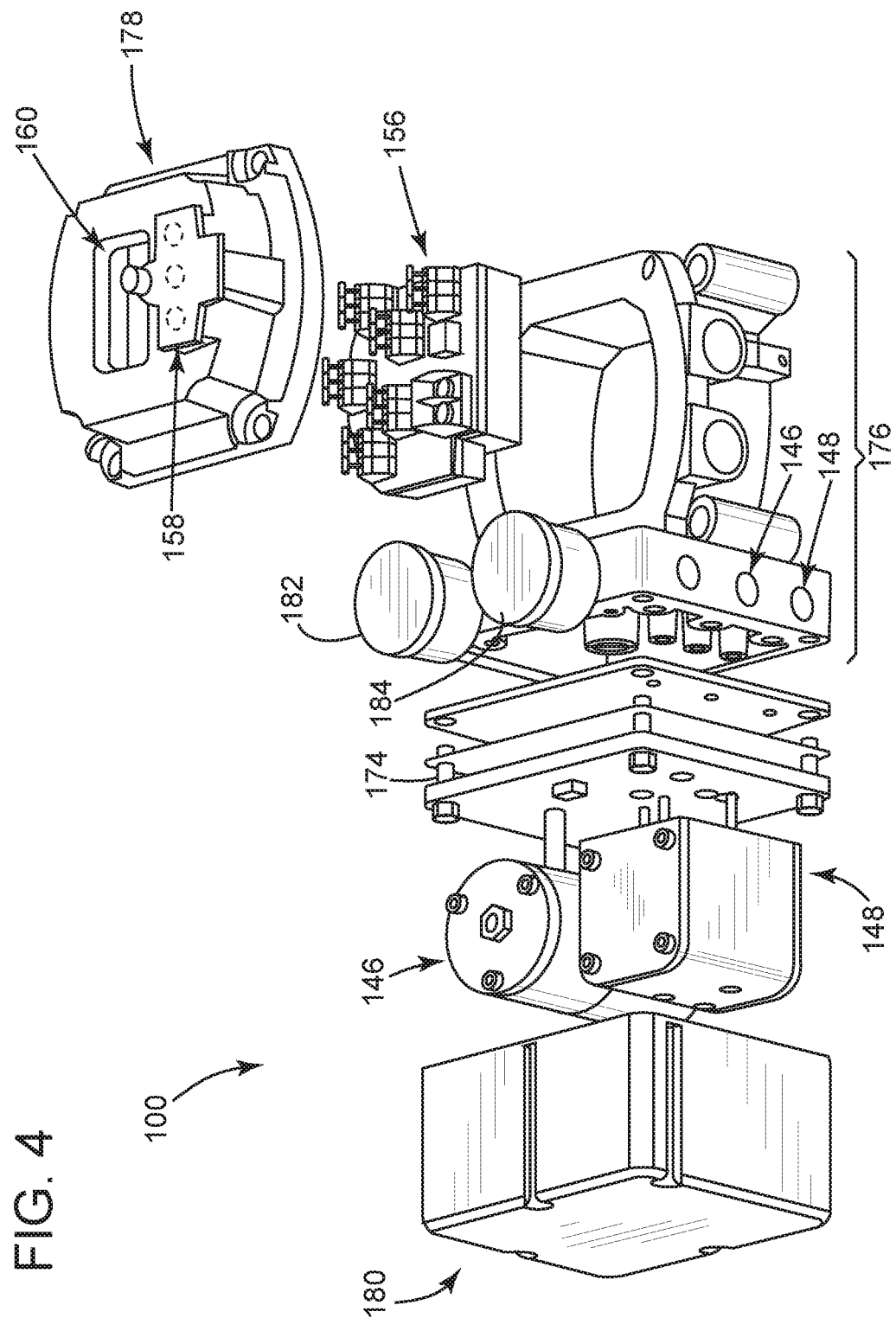
FIG. 4 depicts a perspective view of an example of structure for the controller of FIG. 1 in exploded form.

FIG. 4 depicts a perspective view of exemplary structure for the controller 100 in exploded form. The controller 100 may include a manifold 170 having a manifold body 172, typically machined or formed metal, plastic or composite. The manifold body 172 may include flow features (e.g., openings, flow paths, etc.) to direct fluid among the components of the manifold 170. Standoff devices 174 may operate to mount the signal converter 146 and amplifier 148 to the manifold body 172. The controller 100 may also have an enclosure, shown generally as a central housing 176 and covers (e.g., a first cover 178 and a second cover 180). The covers 178, 180 can secure with the central housing 176 to protect the control components from conditions that prevail in the environment surrounding the valve assembly 102. The pushbutton input device 158 and the display 160 may reside on the first cover 178. The pushbutton device 158 may operate as the primary local user interface to allow an end user (e.g., technician) to interact with the controller 100. This feature may be important for regular maintenance, configuration, and setup, for example, to allow the end user to exit from valve operating mode and step through a menu structure to manually perform functions such as calibration, configuration, and monitoring. The display 160 may embody an LCD display, typically alpha-numeric, or like device for use to read values for the control signal, valve position, or actuator pressure. In one implementation, the controller 100 may further include one or more gauges (e.g., a first gauge 182 and a second gauge 184) that can provide an indication of the flow conditions (e.g., pressure, flow rate, etc.) of the fluid that the controller 100 uses to operate the valve in the valve assembly 102.

Figure 5:
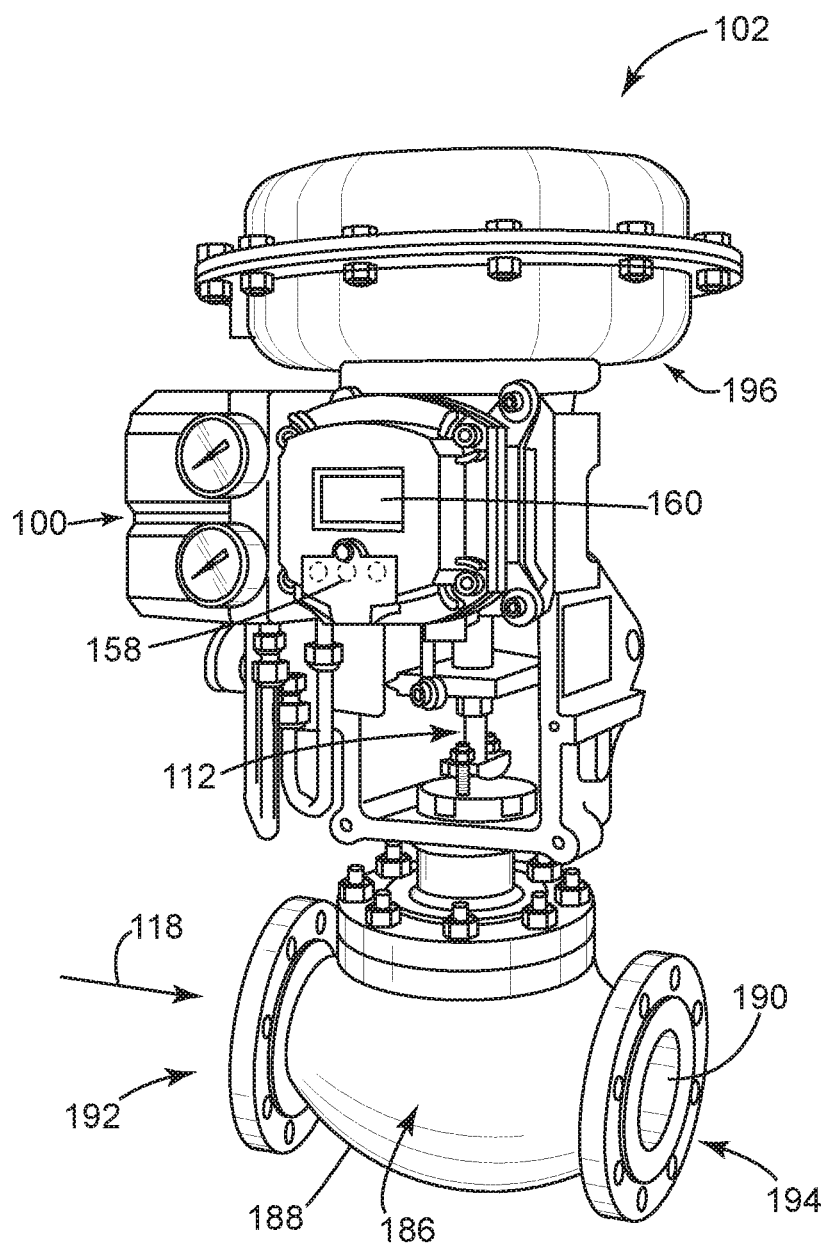
FIG. 5 depicts a perspective view of an example of structure for a valve assembly that includes the controller of FIG. 4.

FIG. 5 depicts a perspective view of exemplary structure for the valve assembly 102. This structure may be useful to regulate process fluids in industrial process lines typical of industries that focus on chemical production, refining production, and resource extraction. As shown, the valve assembly 102 can include a fluid coupling 186 with a body 188 that forms a flow path 190 with open ends (e.g., a first open end 192 and a second open end 194). Valve components like the closure member 110 and seat 112 may reside inside of the body 188 and hidden in the present view. The actuator 104 may include a bulbous housing 196, typically with two pieces that clamp about the edges to entrap a diaphragm (not shown) round the periphery. As noted herein, the actuator often turns pressurized air into mechanical motion that causes the closure member 110 to move relative to the seat 112 between, for example, an open position, a partially-open position, and a closed position. Although not depicted in FIG. 5, a sensing mechanism may be used to monitor the position of the closure member 110. This sensing mechanism can have a position sensor and a mechanical linkage that couples the position sensor with the valve stem 108 or other structure that moves in concert with the closure member 110.

This written description uses examples to disclose the invention, including the best mode, and also to enable any person skilled in the art to practice the invention, including making and using any devices or systems and performing any incorporated methods. An element or function recited in the singular and proceeded with the word "a" or "an" should be understood as not excluding plural said elements or functions, unless such exclusion is explicitly recited. References to "one embodiment" of the claimed invention should not be interpreted as excluding the existence of additional embodiments that also incorporate the recited features. Furthermore, the claims are but some examples that define the patentable scope of the invention. This scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

Examples appear below that include certain elements or clauses one or more of which may be combined with other elements and clauses describe embodiments contemplated within the scope and spirit of this disclosure.

What is claimed is:

1. A valve assembly, comprising:
a valve with a closure member moveable relative to a seat;
an actuator coupled with the valve to move the closure member; and
a controller pneumatically coupled with the actuator via a first pneumatic output and a second pneumatic output, one of which couples directly with the actuator, the controller comprising a pneumatic amplifier with a pair of pneumatic relays, one each coupled with the first pneumatic output and the second pneumatic output, and a volume booster interposed between one of one of the pneumatic relays and the actuator,
wherein the pair of pneumatic relays use a pneumatic input signal at a first pressure to convert incoming instrument air into a pair of pneumatic output signals at a second pressure that is higher than the first pressure.

2. The valve assembly of claim 1, wherein the second pressure is the same for both of the pneumatic output signals.

3. The valve assembly of claim 1, further comprising:
a bypass that diverts fluid around the volume booster.

4. The valve assembly of claim 1, wherein the volume booster comprises an adjustment that is configured to direct fluid around the volume booster.

5. A valve assembly, comprising:
a valve with a closure member moveable relative to a seat;

an actuator coupled with the valve to move the closure member; and a controller pneumatically coupled with the actuator via a first pneumatic output and a second pneumatic output, one of which couples directly with the actuator, the controller comprising a pneumatic amplifier with a pair of pneumatic relays, one each coupled with the first pneumatic output and the second pneumatic output, and a volume booster interposed between one of one of the pneumatic relays and the actuator, wherein the pair of pneumatic relays use a pneumatic input signal at a first pressure to convert incoming instrument air into a pair of pneumatic output signals at a second pressure that is proportional to the first pressure.

6. The valve assembly of claim 5, wherein the second pressure is the same for both of the pneumatic output signals.

7. The valve assembly of claim 5, further comprising:
a bypass that diverts fluid around the volume booster.

8. The valve assembly of claim 5, wherein the volume booster comprises an adjustment that is configured to direct fluid around the volume booster.

9. A valve positioner, comprising:
a signal converter;
a pneumatic amplifier pneumatically coupled downstream of the signal converter, the pneumatic amplifier comprising a first pneumatic relay and a second pneumatic relay;
a pair of output ports, one each coupled downstream of the first pneumatic relay and the second pneumatic relay; and
a volume booster coupled downstream of one of the pair of outputs,
wherein the first pneumatic relay and the second pneumatic relay are configured to use a pneumatic input signal from the signal converter to convert incoming instrument air into a pair of independent, pneumatic output signals, one each to flow to the pair of output ports.

10. The valve positioner of claim 9, further comprising:
a main board coupled with the signal converter, wherein the main board is configured to generate current to operate the signal converter in response to a control signal.

11. The valve positioner of claim 9, wherein the pair of independent, pneumatic output signals exits the pair of output ports at a pressure that is proportionally higher than the pressure of the pneumatic input signal.

12. The valve positioner of claim 9, wherein the pair of independent, pneumatic output signals exits the pair of output ports at pressure that is the same.

13. The valve positioner of claim 9, further comprising:
a bypass that diverts fluid around the volume booster.

14. The valve positioner of claim 9, wherein the volume booster comprises an adjustment that is configured to direct fluid around the volume booster.

15. A method, comprising:
receiving an electronic control signal;
generating a pneumatic input signal in response to the electronic control signal;
using the pneumatic input signal to convert instrument air into a pair of pneumatic output signals;
using the pair of pneumatic output signals to operate an actuator to move a valve; and
flowing one of the pair of pneumatic output signals through a volume booster to increase pressure upstream of the actuator.

16. The method of claim 15, wherein the pneumatic input signal is at a first pressure and the pair of pneumatic output signals are at a second pressure that is proportionally higher than the first pressure.

17. The method of claim 15, wherein the pair of pneumatic output signals are at pressure that is the same.

18. The method of claim 15, further comprising:
tuning output of the volume booster with a bypass that diverts fluid around the volume booster.

* * * * *